United States Patent Office 3,192,385
Patented June 29, 1965

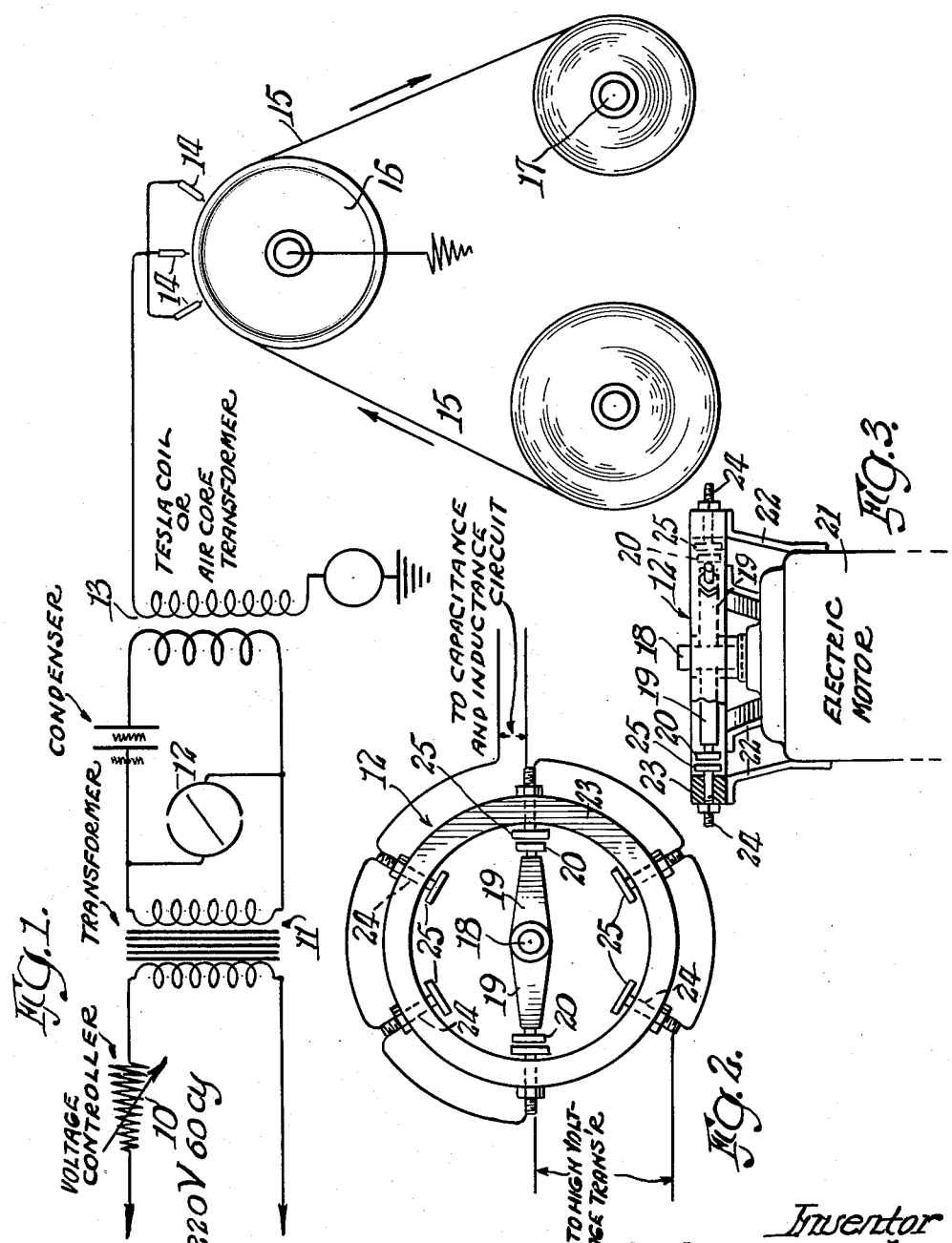

3,192,385
ELECTRICAL DISCHARGE PRODUCING APPARATUS FOR TREATING PLASTIC MATERIALS
Philip Antokal, Chicago, Ill., assignor to E. I. du Pont de Nemours and Company, Wilmington, Del., a corporation of Delaware
Filed Apr. 25, 1961, Ser. No. 105,498
6 Claims. (Cl. 250—49.5)

This invention relates to a plastic treating apparatus and method, and more particularly to high frequency electrostatic and electromagnetic high energy fields to treat normally non-receptive plastics to render the surface thereof adherent to inks, adhesives, and other coating materials.

Various plastic bodies which are non-conductive, such as the polyolefins, polyethylene, polypropylene, polyester resins, etc., will not retain coating materials unless the surface of the plastic is altered in some manner to render it adherent to such materials.

High frequency high voltage electrostatic and electromagnetic high energy fields have been employed for altering the plastic surface, and in these operations a step-up high voltage transformer feeds its high voltage output into a spark-gap-type oscillator having a fixed spark gap, capacitance, and Tesla coil arrangement. The resultant high voltage at high frequency is then applied to an electrode or electrodes spaced advantageously above the plastic surface to be treated, while a grounded electrode is placed on the opposite side of the plastic being treated. The resultant discharge, when the electrodes are energized, causes a change on the surface of the plastic.

One difficulty with the foregoing treating operations is that uniformity of treatment value is not obtained by reason of the fact that there is a "drift" during the operations in which the set conditions change substantially. Further, there is a rapid rate of wearing away of the spark-gap points, and exceedingly high heating of the spark-gap points which causes further rapid deterioration, with the resulting necessity of resetting the gap distance due to rapid wear and also to accommodate changes in the gauge, width, and speed of the material being treated. In such prior operations, there is the further disadvantage in that the treater must be shut down to re-resonate the ouput circuit to accommodate variations in width and gauge of the material to be treated.

An object of the present invention is to overcome the above objections and disadvantages and to make it possible to obtain high uniformity of treatment value of the plastic bodies by reason of the fact that there is no "drift" or change in operating conditions during continuous operation of the apparatus. Another object is to make possible continuous operation without premature failure of the components and modification of operating conditions during operation of the apparatus. A further object is to provide a self-cooling rotary spark-gap which overcomes the practical problems above described and which are encountered in the use of a conventional fixed-gap spark generator. Other specific objects and advantages will appear as the specification proceeds.

The invention is shown, in an illustrative embodiment, by the accompanying drawing, in which—

FIG. 1 is a schematic diagram of a preferred embodiment of the invention; FIG. 2, a top plan view of a rotary spark gap device employed in the practice of the invention; and FIG. 3, a broken side view in elevation of the structure shown in FIG. 2.

In the embodiment illustrated in FIG. 1, the current is supplied through a voltage controller indicated by the numeral 10 to a transformer 11. The output of the high voltage transformer 11 is fed across the rotary spark-gap, which is indicated generally by the numeral 12, which in turn is connected through an L/C circuit, the ratio of which is variable to enable a frequency change, and closely coupled to the inductance of this circuit is the secondary inductance which may be a step-up air core transformer as indicated by the numeral 13. The high voltage high frequency output from the secondary coil 13 is then applied to the treating electrodes 14 upon the plastic film 15 carried by the grounded roller 16. The shaft of the roller 16 may be driven, or, alternatively, the take-up shaft 17 may be driven by suitable power means. If desired, the shafts of the supply roller drum 16 and take-up shaft 17 may both be driven.

The rotary spark-gap 12, as illustrated in FIGS. 2 and 3, comprises a motor-driven shaft 18 equipped with a conductor arm 19 terminating in points or terminals 20. Supported upon the electric motor 21 and about the connected arm 19 by means of straps 22, is the insulator ring 23. Extending through the ring 23 formed of insulating material are conductors 24 terminating in points or terminals 25 which are spaced by a gap from the terminals 20 of the rotating arm 19. While in the specific illustration given I have shown for the purpose of illustration only six conductors supported by the ring 23, it will be understood that these may be of any desired number depending upon the results that are desired. While also I have shown the motor shaft 18 and the arm 19 mounted for rotation, it will be understood that alternatively these may be stationary and a motor may be employed for rotating the ring 23 relative to the arm 19.

In the specific illustration given, the arms are rotated rapidly, and these dissipate the heat which is normally generated so that the apparatus will operate continuously at substantially ambient temperature. The rotating arms, with their points, have the advantage of producing a constant variation in the actual gap distance, the rotating terminal or point moving from a position closest to that of the stationary ring point and then on to a point of maximum separation. Thus, there is always some point at which the optimum gap distance is present for balance with the other existing conditions in the circuit, these being primarily gauge and width variations of the materials being treated. Since these materials are dielectric, they influence the resonance of the circuit according to their volumetric presence in the field.

The rotating spark-gap arrangement gives a uniformity of wear of the points, thus virtually eliminating the need for the periodic adjustment which is a constant and troublesome factor in the conventional fixed spark-gap arrangement. The rotating spark-gap further permits the transfer of the higher levels of energy from given components, since the transmission rate is uniform as contrasted with the characteristically shifting transmission experienced through the fixed spark-gap apparatus by reason of uneven wear and consequent continual reduction of the amperage delivered as the gap increases through wear.

Because of the pulsating gap effect obtained by the movement of the rotating gap relative to the fixed gap, I am able to substantially control the entire circuit within broad ranges of operational requirements, merely by varying the primary input voltage as through a voltage controller. The optimum operating characteristics for any give width and gauge of material being treated can then be noted by varying the voltage until the radio frequency amperes are maximized as shown by an R-F ammeter in the output circuit. Thus, this simple control substantially replaces the need for changes in the Tesla coil ratios and changes in the capacitance of the circuit to accommodate changes in width or gauge of material being treated. However, where extremely wide range of control is desired from a given unit, it is possible to substantially widen the normal control range of a fixed-gap frequency generator by combining the rotary gap controllability with the steps of changing the inductance and capacitance ratios as is normally done for purpose of control in a fixed spark-gap generator.

As a specific example, I have employed the unit consisting of a powerstat in operation in a 220 volt, 60 cycle line which controls the applied voltage to the primary of a high voltage transformer, using a Variac for the voltage control. The transformer consists of a step-up ratio of 100:1, and it is designed to carry a 15 ampere load on the primary. The output of the high voltage transformer is fed across the rotary spark-gap, which in turn is connected through an L/C circuit, the ratio of which is variable to enable a frequency change in steps to be made from 100 kilocycles to one megacycle. Closely coupled to the inductance of this circuit is a secondary inductance forming a step-up air core transformer-like arrangement. The high voltage high frequency output from this secondary coil is then applied to the treating electrode. The rotary spark-gap consists of 16 stationary points arranged in a circle, inside of which two points mounted on a rotating conductor arm and spaced from the stationary points are rotated at the rate of 1800 r.p.m. This rotation provides cooling of the points, even wear of the points, and the important gap control heretofore described for providing the desired optimum gap distance during the treating operation. As a result of the use of the foregoing apparatus in treating polyethylene, polypropylene and polyester resins (Mylar), it was found that there was greater uniformity of treatment even though film of varying thicknesses was passed under the treating electrodes.

While, in the foregoing specification, I have set forth certain structures and steps in considerable detail for the purpose of illustrating the invention, it will be understood that such details may be varied widely by those skilled in the art without departing from the spirit of my invention.

I claim:

1. Apparatus for treating a non-conductive plastic body to improve the receptivity of a surface thereof to coating material, comprising a pair of spaced electrodes, one of which is grounded, high voltage radio frequency generating means for supplying radio frequency voltage to the non-grounded electrode to produce a discharge between said electrodes, means for moving said plastic body between said electrodes, said high frequency generating means including a non-conductive ring member bearing a plurality of spaced conductors and a conductor arm having terminal portions spaced from the conductors of said ring member for providing spark-gaps therebetween, and means for rotating one of said members concentrically relative to the other.

2. The apparatus of claim 1 in which the arm member is rotated within said ring member.

3. The structure of claim 1 in which motor means are provided for rotating one member relative to the other for cooling the same.

4. In apparatus for treating a non-conductive plastic body to improve the receptivity of a surface thereof to coating material, a pair of spaced electrodes, one of which is grounded, high voltage radio frequency generating means for supplying radio frequency voltage to one of said electrodes to produce discharge between said electrodes, and means for moving said plastic body between said electrodes, said high frequency electric generating means comprising a self-cooling rotary spark-gap in which there is supported above a motor a non-conductor ring having spaced conductors thereon and an arm carried by the motor shaft mounted for rotation within said ring, said arm having terminal points spaced from said conductors, said arm being rotated rapidly as a cooling fan within said ring.

5. In apparatus for treating a non-conductive plastic body to improve the receptivity of a surface thereof to coating material, a pair of spaced electrodes, means for passing said plastic body between said electrodes, high voltage radio frequency generating means for supplying radio frequency current to one of said electrodes to produce a discharge upon the plastic body, said high frequency generating means including a rotary spark-gap in which a rotating member having at least one conductor terminal is rotated in a circle past spaced conductors.

6. The structure of claim 5 in which means are provided for rotating the rotary member at a speed of 1200–1800 r.p.m.

References Cited by the Examiner

UNITED STATES PATENTS

| | | | |
|---|---|---|---|
| 1,265,959 | 5/18 | Richter | 313—149 |
| 2,222,268 | 11/40 | Schonfeld | 313—149 |
| 2,939,956 | 6/60 | Parks | 204—168 |

JOHN H. MACK, *Primary Examiner.*

JOSEPH REBOLD, JOHN R. SPECK, *Examiners.*